Jan. 30, 1934.  M. EVOY  1,945,426
LOADING HOIST FOR TRUCKS
Filed Dec. 14, 1931  5 Sheets-Sheet 1
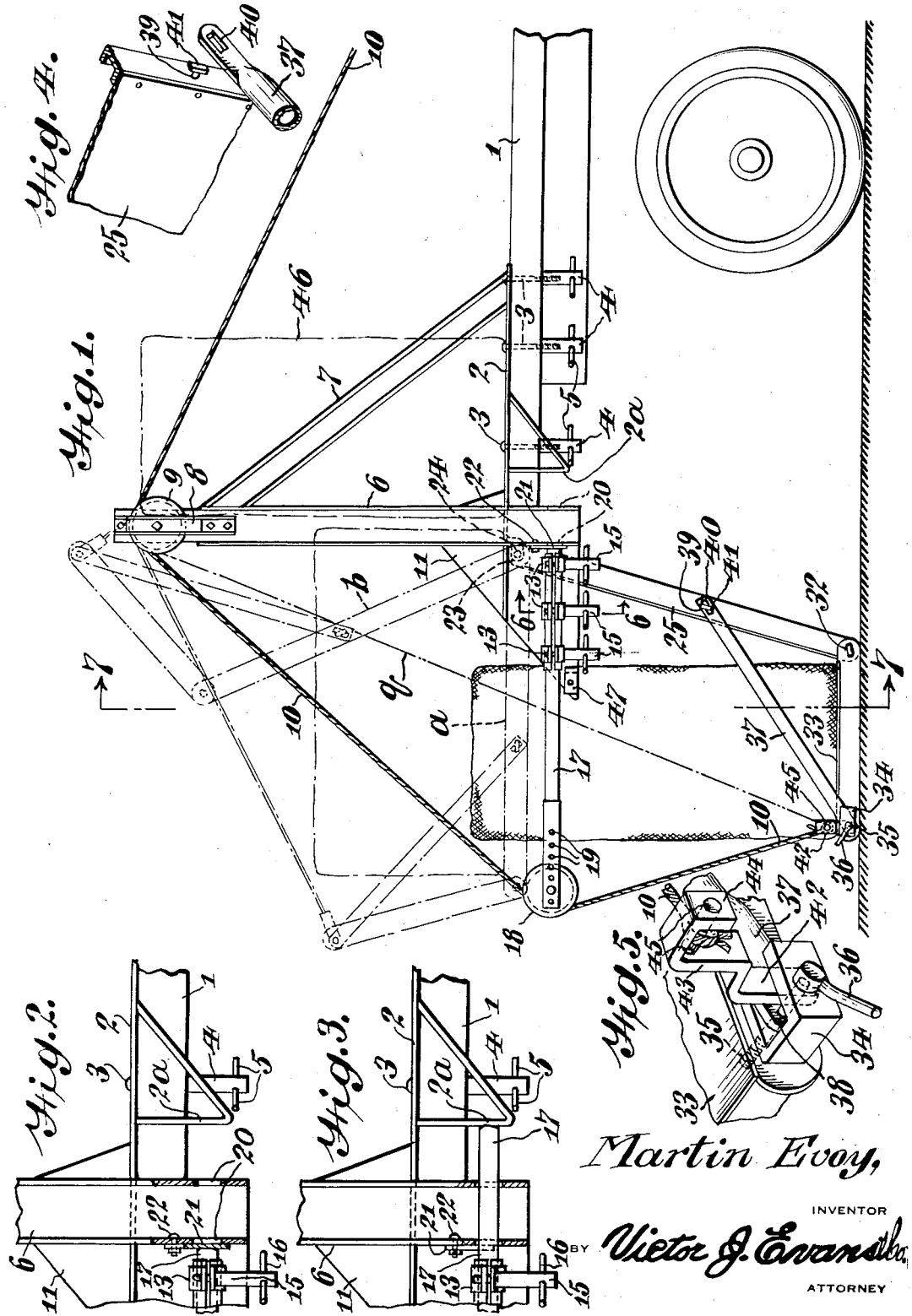
Martin Evoy,
INVENTOR
BY Victor J. Evans
ATTORNEY

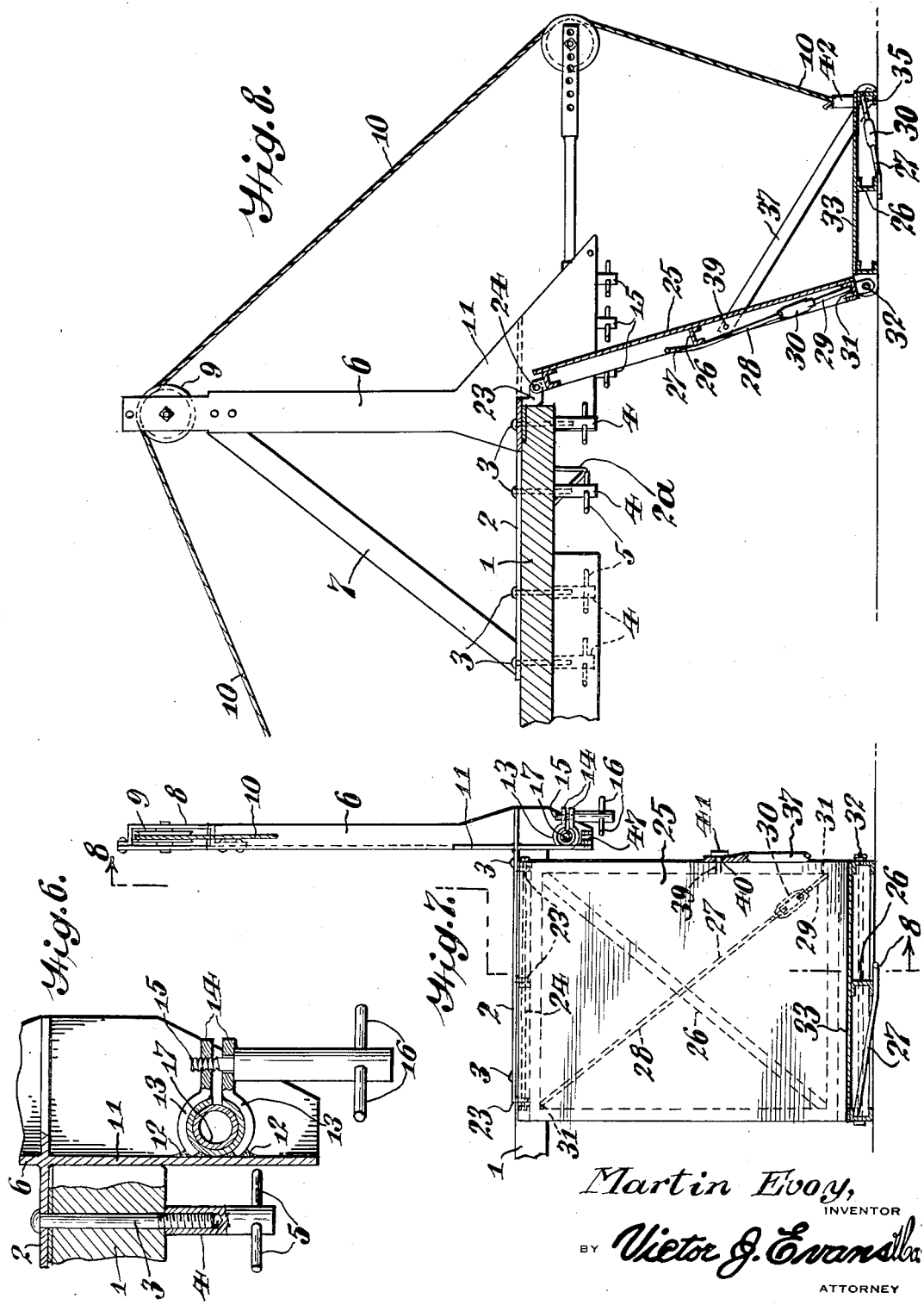

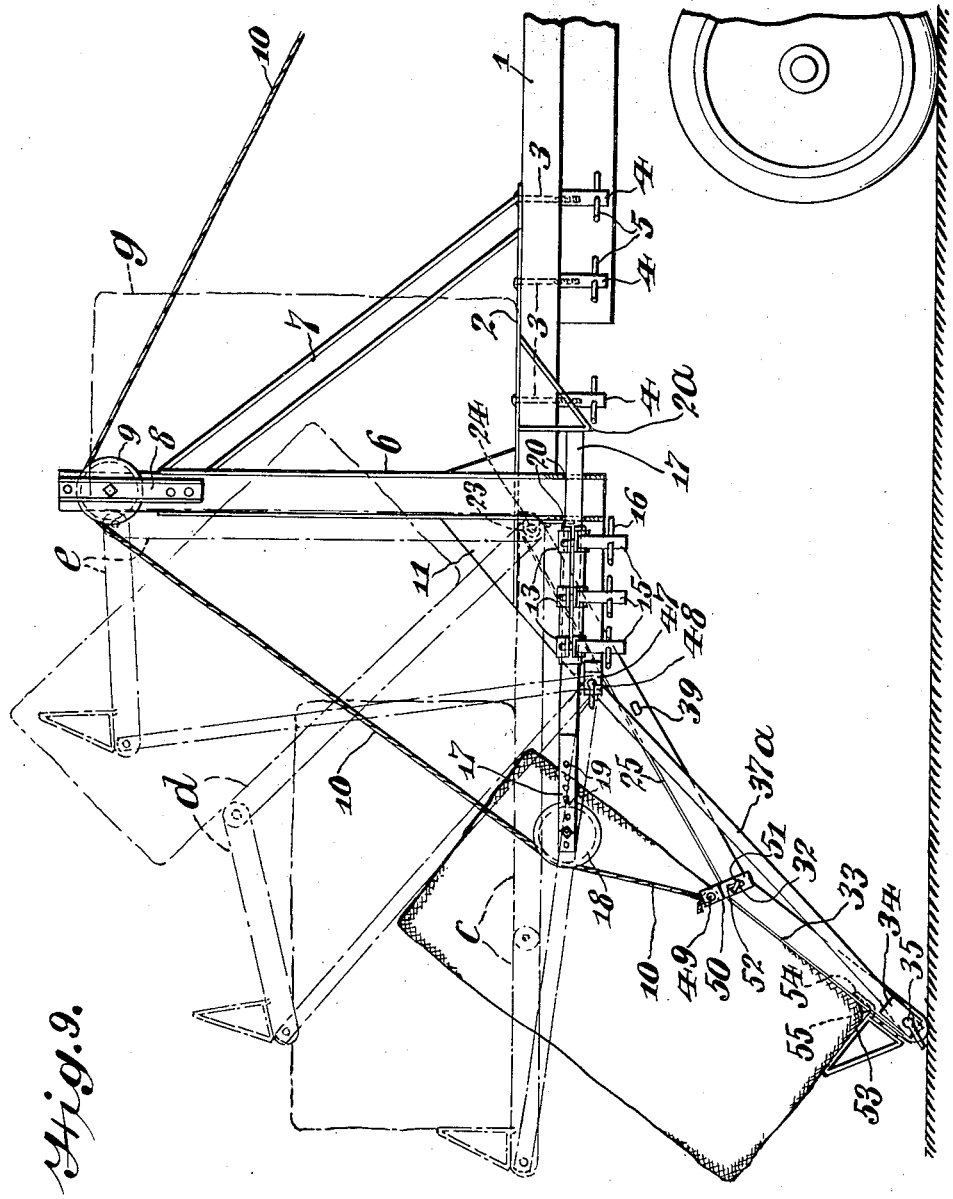

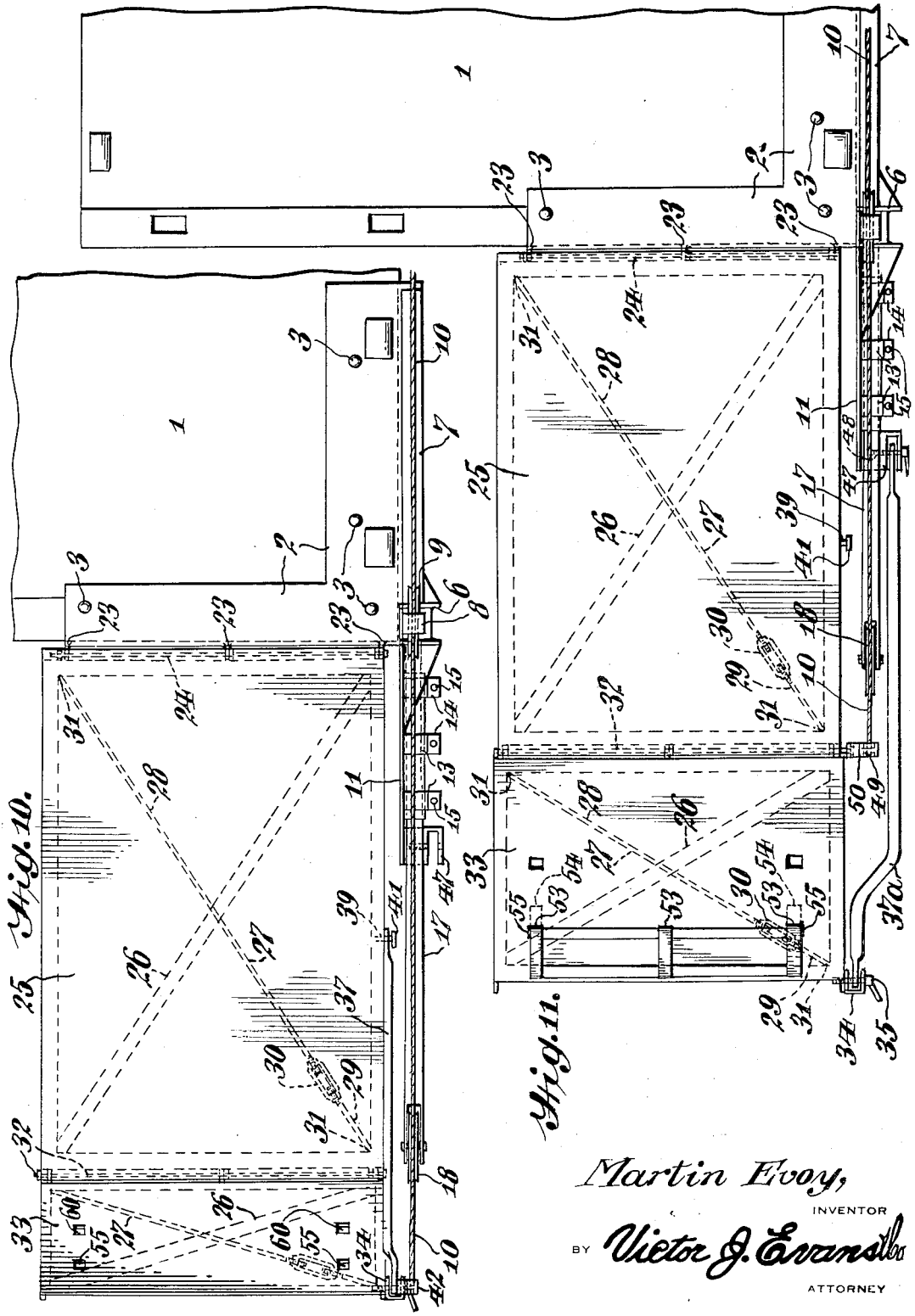

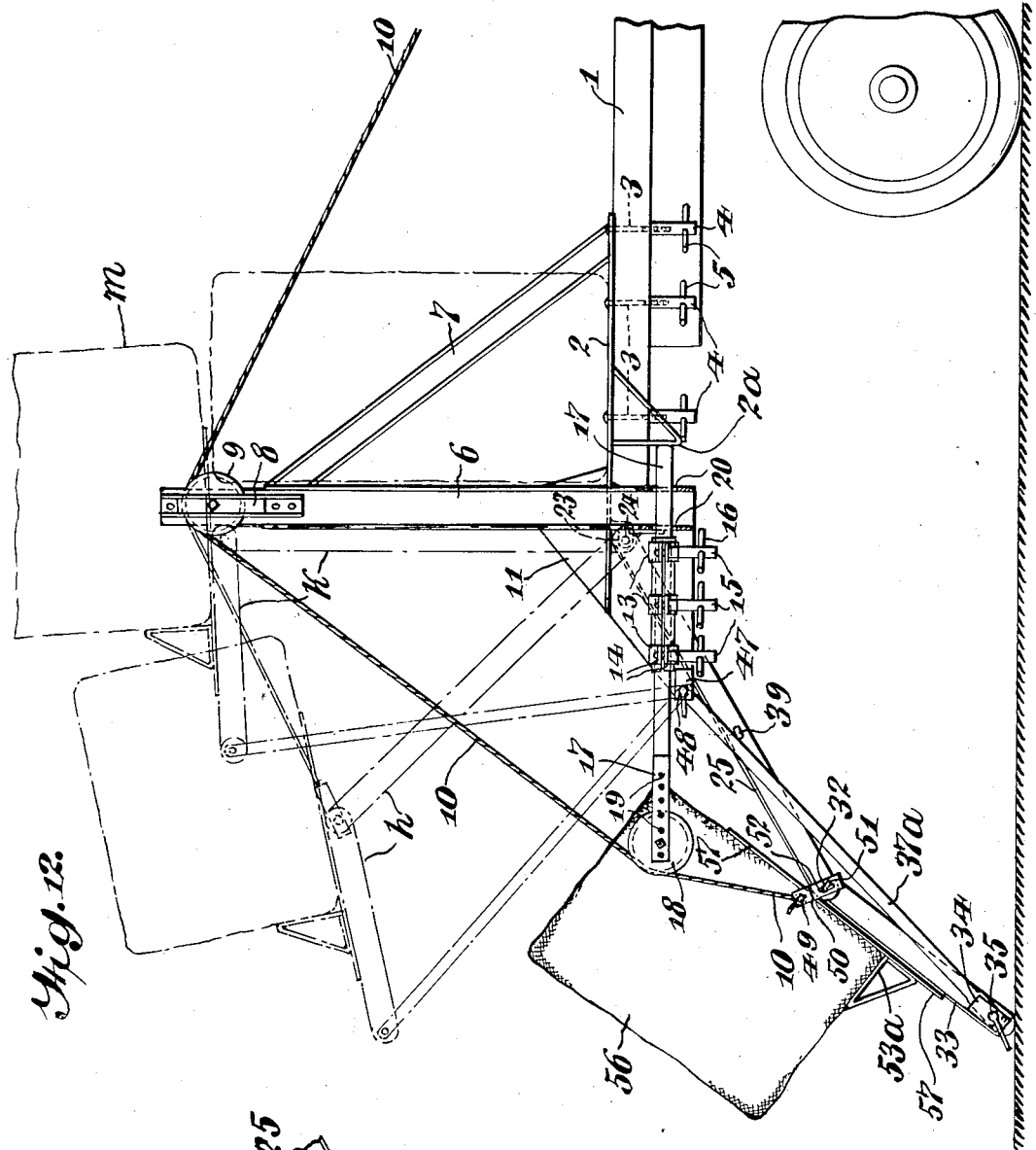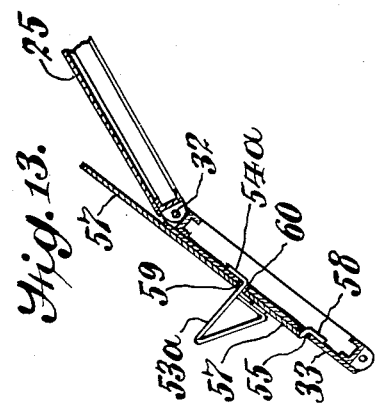

Patented Jan. 30, 1934

1,945,426

UNITED STATES PATENT OFFICE 1,945,426

LOADING HOIST FOR TRUCKS

Martin Evoy, Philadelphia, Pa.

Application December 14, 1931
Serial No. 581,012

12 Claims. (Cl. 214—77)

This invention relates to an improved loading hoist for use in connection with trucks and the like, and it is the purpose to provide in a hoist, a construction wherein the hoisting operation is in three stages. For example the bales may be first hoisted from the ground to and within the truck body, and then by eliminating an element and substituting an entirely different device, bales may be hoisted from the ground to the truck body to provide for one row and then from the ground and high enough so as to be hoisted on top of the first row.

Another purpose is to provide a loading hoist capable of being attached and detached to the floor of the truck body, without any alterations to the truck, and when detached from the truck it can be arranged in a small compass and disposed to one side, without consuming excess of space.

When the loading hoist is attached to the truck it does not take up any great amount of room on the truck, does not interfere with the loading of the bales or barrels, the truck being capable of loading to its full capacity, and after the truck is loaded the loading hoist can be positioned up behind the rear of the bales at the end of the truck and assist in retaining the load in position.

It is to be understood that the particulars herein given are in no way limitative, and that while still keeping within the scope of the invention, any desired modification of details and proportions may be made in the construction of the appliance according to circumstances.

The invention comprises further features and combination of parts to be hereinafter set forth, shown in the drawings and claimed.

In the drawings:—

Figure 1 is a view in side elevation of a portion of a truck body showing the improved loading hoist as applied, the hoist being adapted to load from the ground or pavement to the truck body.

Figure 2 is an enlarged detail view in elevation, with the lower part of the standard in section showing the manner of mounting an extension for the support of a pulley, and also illustrating how a base of the standard is secured to the truck flooring or body.

Figure 3 is a view similar to Figure 2 showing the pulley supporting extension adjusted in another position.

Figure 4 is a detail perspective view illustrating how a brace connects with one of the loading platforms.

Figure 5 is a perspective view illustrating how the other end of the brace shown in Figure 4 is connected to the other loading platform, and also illustrating how the cable or rope is connected to one of the loading platforms for hoisting the same.

Figure 6 is a sectional view on line 6—6 of Figure 1 showing clamping means for supporting the pulley carrying extension, and also illustrating how the base plate of the standard is connected to the floor of the truck.

Figure 7 is a sectional view on line 7—7 of Figure 1.

Figure 8 is a sectional view on line 8—8 of Figure 7.

Figure 9 is a view in side elevation showing a portion of a truck body and illustrating the hoist for loading the bales from the ground to the truck body, showing the bales being placed in position on their ends.

Figure 10 is a plan view of the arrangement of hoist shown in Figure 1.

Figure 11 is a plan view of the arrangement of hoist shown in Figure 9.

Figure 12 is a view in side elevation of a portion of a truck body illustrating a differently arranged hoist for hoisting the smaller sized bales, where one row of bales is first placed on a truck and then a second row on top of the first row.

Figure 13 is a sectional view through the two pivotally united hoisting platforms, illustrating an auxiliary loading plate, which is used for hoisting the bales on top of other bales, as illustrated in Figure 12.

Referring to the drawings 1 identifies the rear portion of a truck body, which may be of a conventional type, and mounted on the rear end of the floor of the truck body is a base plate 2 secured in position by the bolts 3, which pass through the floor of the truck body and threaded thereto are sleeve nuts 4 provided with transverse handles 5, by which the sleeve nut can be tightened, to render the plate 2 secure.

Rising from the plate 2 is a standard or upright 6 reinforced by an angularly arranged brace 7, which also forms a part of the plate 2. However it is possible to make the standard 6 and the brace 7 separate from the plate 2, but attached to it in any well known way. Depending from the plate 2 is a triangular abutment 2a, the purpose of which will appear later. Carried by the upper end of the standard or upright 6, by means of a strap iron 8 is a pulley 9, over which a cable or rope 10 passes. The strap iron 8 constitutes a bearing for the journal of the pulley 9. The cable or rope 10 extends toward the front part of the truck and is designed to connect by several turns with a winding drum (not shown), but may be operated by the motor (not shown) of the truck, for the purpose of hoisting the loading platforms.

A triangular brace or support 11 projects rearwardly from the standard or upright, and secured to the side face of this support 11 by any suitable means preferably electrical spot welding or the like as shown at 12 is a plurality of circular clamps 13, the ends 14 of which receive screws 15 provided with transverse handles 16, by which the clamps can be tightened or loosened, as may be desired, for holding and permitting use of a rearwardly extending rod 17. This rod may be solid or tubular, preferably the latter. A suitable pulley 18 is carried by the rear end of the extension rod 17, and over which the rope or cable 10 passes, while the loading platforms are in their lowermost positions. The rear end portion of the extension rod 17 has a plurality of openings 19 for the purpose of permitting the pulley 18 to be adjusted.

The standard or upright 6, while it may be any conventional construction, it is preferably channel iron, and the lower ends of its flanges have openings 20, through which the tubular rod 17 may be extended, for the purpose of engaging with the abutment 2a as in Figure 12, when the loading platforms are used in their relative positions as disclosed in Figures 9 and 12. When the extension rod 17 is used as in Figure 1 and as detailed in Figure 2 a plate 21 pivoted at 22 may be disposed in position, to overlie one of the openings 20, to prevent the extension rod 17 from engaging through the openings 20.

Ears or lugs 23 as shown in Figure 8 are carried by the rear edge of the plate 2, and passing through the ears or lugs is a hinge rod 24, to which a loading platform 25 is hingedly mounted. While the loading platform 25 may be any suitable construction, it is preferably a cast design and is reinforced by a diagonal brace 26, preferably of channel iron construction as shown in Figure 8, and which is spot or electrically welded to the parts of the platform. Also this platform 25 is further reinforced by a diagonal brace rod 27, the two sections 28 and 29 of which are connected by a turn buckle 30, while their remote ends are electrically or spot welded at 31 in diagonal opposite corners of the platform. The diagonally arranged brace rod 28 overlies the reinforcing channel beam 26, as shown in Figures 7 and 8, particularly Figure 8. By means of these reforcings, it is possible for the platform to withstand the weight of the load of the bales on the inner free portions of the platform.

Pivotally connected at 32 to the loading platform 25 is a second loading platform 33, which is similar in construction and likewise reinforced to that of the platform 25, and in this case the corresponding parts are likewise identified.

A U shaped bracket 34 is secured to one side of the loading platform 33 by means of a screw 35 shown more or less in dotted lines in Figure 5, and this screw has a lateral handle 36, whereby it may be tightened into the side structure of the loading platform 33. A brace 37 is connected at 38 to the screw 35, the end of the brace being located between the sides of the U shaped bracket 34, and this brace 37 is in turn connected to a headed pin 39 on the side of the loading platform 25. The fact is the brace 37 has an elongated slot 40 in its upper forward end, the slot permitting of the reception of the elongated rectangular head 41 of the pin 39. The brace 37 may be disposed in a position so that the head 41 will pass through the elongated slot 40, and then by arranging the brace 37 as in Figure 1 and then connect the rear lower end to the screw 35, the head 41 will lie angularly across the slot 40 and thereby prevent disconnection. Also secured in position in the U shaped clamp or bracket 34 by means of the screw 35 is a clevis plate 42, through opposite walls 43 and 44 of which a pin 45 engages and holds fast in any suitable manner (not shown). The rear lower end of the cable or rope 10 is engaged around the pin 45, and its extremity is wrapped in any well known manner to the body of the rope, in order to insure a secure connection.

As previously stated the forward end of the rope 10 makes one or two turns around a winding drum (not shown) but carried by the forward end of the truck body and operated by its motor and the free extremity of the rope at a point beyond the winding drum is held by an operator. When using the hoist loading apparatus in the manner as shown in Figure 1 the two platforms 25 and 33 are positioned as disclosed in Figure 1. The bale or barrel is carried to the platform 33 by a hand-truck (not shown), disposed on the platform 33 as shown in full lines in Figure 1. The winding drum (not shown) but to be carried by the forward end of the truck is rotating at all times, therefore the operator holding the free end of the rope at a point beyond the drum tightens the rope on the drum, thereby imparting movement to the rope, which will hoist the two platforms to the two positions shown in dot and dash lines in Figure 1, therefore disposing the bale or barrel on its end as shown in dot and dash lines at 46. An operator on the floor of the truck then handles the bale by grap hooks so as to dispose the bale or barrel toward the forward end of the truck.

It is to be noted by reference to Figure 10 that the rope or cable assumes a position to align at all times from the pulley 9 to its connection to said platforms over the pulley 18, so that the rope may disengage from the pulley 18 when the loading platforms move to the two dot and dash line positions a and b in Figure 1, and when the loading platforms are again restored to their lowermost positions as in full lines in Figure 1 the rope 10 will re-engage with the pulley 18.

When using the loading hoist as in the manner as shown in Figure 9 and Figure 12 the brace 37 is dispensed with, and a similar brace 37a substituted, this brace 37a is connected at its upper forward end to a U shaped clevis 47 by means of a screw 48, the clevis 47 being conveniently fixed in any well known manner to the extremity of the support 11. The lower end of the brace 37a is then connected to the screw 35. In using the brace 37a in lieu of the brace 37 in Figure 1 the loading platform 33 is disposed in a position as shown in Figure 9 or as shown in Figure 12. In this instance the rope 10 is connected at 49 to a U shaped clevis 50, which is pivotally mounted on the headed pivot 51. This headed pivot is similar in construction to that shown in Figure 4, and its head first engages through elongated slot 52 of the clevis 50, and after the clevis is disposed in a position as in Figure 9, the head cannot disengage from the slot 52.

In using the loading hoist as in Figure 9 a triangular abutment rest 53 has its feet 54 engaged through openings 55 of the loading platform 33, therefore when loading the truck as in Figure 9, a bale or barrel is carried to a position where it can be disposed on the platform 33 in engagement with the abutment rest 53, as shown in full lines in Figure 9. The operator at the forward end of the truck then tightens the rope on the winding drum (not shown), in which case a pulling action is imparted to the rope, thereby hoisting the platforms to the several dot and dash line positions c, d, and e as shown in Figure 9. In hoisting the platforms to these several different positions, it will be noted that the platforms 25 and 33 change in their relative positions, until the bale is disposed on its end as shown in a dot and dash line position at g. The relative changed positions of the platforms 25 and 33 are due to the brace 37a and where it is pivoted to the extremity of the support 11.

In loading the truck as in Figure 12, that is to say to place smaller bales or barrels 56 on the upper ends of larger bales or barrels an auxiliary plate 57 is mounted upon the platform 33. This auxiliary plate 57 is provided with lugs 58 which engage through the openings 55 of the platform 33, as shown in Figures 12 and 13. An abutment rest 53a identical with 53 in Figure 9 is used in connection with the auxiliary plate 57. The abutment rest has feet 54a which engage through openings 59 (which register with openings 60 of the platform 33) of the auxiliary plate 57, so that the feet 54a may pass through the openings 60. This arrangement and construction is shown clearly in Figure 13. In this instance the smaller bales or barrels 56 are carried to and disposed on the abutment rest 53a. As in full lines in Figure 12, then the rope 10 is operated as before, hoisting the loading platforms 25 and 33 to the several dot and dash line positions h and k, so that the smaller bale or barrel may be disposed on the upper ends of the larger bales or barrels as shown in dot and dash lines at m in Figure 12. After hoisting the bales or barrels to a position as herein named the operator at the forward end of the truck loosens on the rope, allowing it to slip so that the loading platforms may return to their lowermost positions as in full lines in the several figures.

Referring to Figure 1 it is to be noted that when loading relatively small bales the rope 10 need not pass over the pulley 18. It may extend direct from its connection at 25 over the pulley 9, as shown in dot and dash lines at q and in this instance the rod 17 may be removed.

The invention having been set forth, what is claimed is:

1. The combination with a truck body having a standard provided with a pulley thereon, of a pair of loading platforms fulcrumed to the rear of the truck body, one of said loading platforms acting as a pivoted extension to the other platform, means for causing the extension platform to assume different angular positions as the other platform is tilted upwardly and forwardly, and an auxiliary platform adjustable on the extension platform and to be engaged by a bale to be hoisted and loaded on the truck body.

2. The combination with a truck body having an upright including a pulley thereon, of a pair of loading platforms fulcrumed to the rear of the truck body and one being an extension platform, said platforms being pivotally connected to each other, a support at the rear of the truck body, a rod connecting the support and the extremity of the extension platform, causing the extension platform to vary in its angular position as the other platform raises, an auxiliary platform on the extension platform, and means passing over the pulley and connected to one of the platforms for hoisting said platforms.

3. The combination with a truck body, of a hoist loading apparatus removably supported on the rear end of the truck body, said apparatus comprising a base secured to the floor of the truck body and having a standard, a pair of pivotally united loading platforms, one being fulcrumed to the base at one extreme side of the truck body, the other constituting an extension adapted for engagement with the ground, the latter being provided with an auxiliary platform to be engaged by a bale to be hoisted and loaded on the truck body, and a hoisting element provided with a traversing connection with the upper end of the standard and in turn operatively connected to the platforms for hoisting same, said base and the standard being positioned permanently adjacent said one extreme side of the truck body, whereby said hoisting element may cooperate with the united loading platforms for actuating them.

4. The combination with a truck body, of a hoist loading apparatus removably supported on the rear end of the truck body, said apparatus comprising a base secured to the floor of the truck body and having a standard, a pair of pivotally united loading platforms, one being fulcrumed to the base, the other having engagement with the ground, the latter being provided with means to be engaged by a bale to be hoisted and loaded on the truck body, and a hoisting element provided with a traversing connection with the upper end of the standard and in turn operatively connected to the platforms for hoisting same, and means carried by one of the platforms for placing certain small bales upon the upper ends of certain other larger bales previously loaded upon the truck.

5. The combination with a truck body, of a hoist loading apparatus removably supported on the rear end of the truck body, said apparatus comprising a base secured to the floor of the truck body at one side thereof and having a standard, a pair of pivotally united loading platforms, one being fulcrumed to the base at one extreme side of the truck body, the other constituting an extension adapted for engagement with the ground, the latter being provided with an auxiliary platform, a hoisting element provided with a traversing connection with the upper end of the standard and in turn operatively connected to the platforms for hoisting the same, and means for causing the extension platform to gradually vary in angular positions relative to the platform pivoted to the base during the entire arc of movement of the platform which is pivoted to the base, said base and the standard being positioned permanently adjacent said extreme side of the truck body, whereby said hoisting element may cooperate with the united loading platforms for actuating them.

6. The combination with a truck body, of a hoist loading apparatus removably supported on the rear end of the truck body, said apparatus comprising a base secured to the floor of the truck body and having a standard, a pair of pivotally united loading platforms, one being fulcrumed to the base at one extreme side of the truck body, the other constituting an extension adapted for engagement with the ground, a hoisting element provided with a traversing connection with the upper end of the standard and in turn operatively connected to the platforms for hoisting the same, and means for causing the extension platform to gradually vary in angular positions relative to the platform pivoted to the base during the entire arc of movement of the platform which is pivoted to the base, said base and the standard being positioned permanently adjacent said extreme side of the truck body, whereby said hoisting element may cooperate with the united loading platforms for actuating them.

7. The combination with a truck body, of a base removably secured to the truck body, a standard rising from the base, dominant and extension platforms, the former being pivotally supported on the base at one extreme side of the truck body, means for causing the extension platform to gradually change in angular positions to the main platform during the entire arc of movement of the main platform, said dominant platform and the standard being positioned permanently adjacent one extreme side of the truck body, whereby a hoisting element can co-operate therewith for operating said platform.

8. The combination with a truck body, of a base removably secured to the truck body, a standard rising from the base, dominant and extension platforms, the former being pivotally supported on the base, means at one side and associated with the standard for hoisting the platforms, and means embodied in the under face of the structure of the main platform for reinforcing the same and offsetting any stress on the main platform due to the hoisting means being to one side of the truck body.

9. The combination with a truck body, of a base removably secured to the truck body at one side thereof, a standard rising from the base, dominant and extension platforms, the former being pivotally supported on the base, means for causing the extension platform to gradually change in angular positions to the main platform during the entire arc of movement of the main platform, and an auxiliary platform operatively and adjustably carried by the extension platform.

10. The combination with a truck body, of a base removably secured to the truck body at one side thereof, a standard rising from the base, dominant and extension platforms, the former being pivotally supported on the base, means for causing the extension platform to gradually change in angular positions to the main platform during the entire arc of movement of the main platform, and an auxiliary platform operatively and adjustably carried by the extension platform, means at one side and associated with the standard for hoisting the platforms, and means embodied in the under face of the structure of the main platform for reinforcing the same and offsetting any stress on the main platform due to the hoisting means being to one side of the truck body.

11. The combination with a truck body, of main and extension platforms pivotally united, the former being fulcrumed to the rear end of the truck body adjacent permanently to one extreme side of the truck body, a standard adjacent said extreme side of the truck body, hoisting means positioned at one extreme side of the truck body and provided with a traversing connection with said standard, said hoisting means in turn being operatively connected with said platforms for hoisting the latter.

12. The combination with a truck body, of main and extension platforms pivotally united, the former being fulcrumed to the rear end of the truck body to one side of its center and to the extreme side of the truck body, hoisting means positioned at one extreme side of the truck body and in turn operatively connected with said platforms for hoisting the latter, and means embodied in the structure of the main platform adjacent its under face for reinforcing the same and offsetting any stress or strain on the free side of the main platform.

MARTIN EVOY.